United States Patent [19]

Satou

[11] 4,339,410

[45] Jul. 13, 1982

[54] CONTROL FOR LIQUID PLANT

[75] Inventor: Takahisa Satou, Tokorozawa, Japan

[73] Assignee: Tokyo Shibaura Electric Co., Ltd., Kawasaki, Japan

[21] Appl. No.: 148,993

[22] Filed: May 12, 1980

Related U.S. Application Data

[63] Continuation of Ser. No. 862,275, Dec. 19, 1977, abandoned.

[30] Foreign Application Priority Data

Dec. 17, 1976 [JP] Japan ................................. 51/151807

[51] Int. Cl.³ .............................................. G21C 7/00
[52] U.S. Cl. .................... 376/216; 376/215; 376/245; 376/361
[58] Field of Search .................... 176/19 R, 20 R, 24, 176/64, 65, 44, 50, 40, 57

[56] References Cited

U.S. PATENT DOCUMENTS

| | | | |
|---|---|---|---|
| 3,423,285 | 1/1969 | Curry | 176/24 |
| 3,752,735 | 8/1973 | Musick | 176/19 R |
| 3,791,922 | 2/1974 | Musick | 176/24 |
| 3,912,584 | 10/1975 | Rubinstein | 176/40 |
| 3,931,500 | 1/1976 | Berkebile | 176/24 |
| 4,080,251 | 3/1978 | Musick | 176/24 |

OTHER PUBLICATIONS

"FSAR", Fast Flux Test Facility, FSAR, vol. 3, Dec. 1975, ERDA Contract No. AT(45-1)-2170.

"Clinch", Preliminary Safety Analysis Report, Chap. 9–Auxiliary Systems, Proj. Mgt. Corp.

Primary Examiner—Donald P. Walsh
Attorney, Agent, or Firm—Oblon, Fisher, Spivak, McClelland & Maier

[57] ABSTRACT

A temperature control system for liquid plant is comprised of liquid metal, plant members, heaters for heating these liquid metal and the plant members at respective control points, a temperature control unit and a control unit. The plant members include a vessel containing liquid metal, pipe lines through which the liquid metal circulates, and valves. Further, temperature sensors, a level detector for detecting the level of the liquid metal, and a meter for detecting the flow rate of the liquid metal, are mounted to the plant members. Temperature sensors produce output signals relating to the condition parameter of the plant which data is delivered via an interface to the temperature control system and the control unit, as the information at each control point. The control unit previously stores the operating schedule of the plant members and transfers, the input signal relating to the plant condition to the temperature control system, with reference to the temperature control schedule. The temperature control system calculates the input signal relating to the process value on the basis of the control information to decide the control value of which the result is applied to the interface. The interface controls the electrical power to be supplied to the heaters at the respective control points in accordance with the control signal inputted.

11 Claims, 16 Drawing Figures

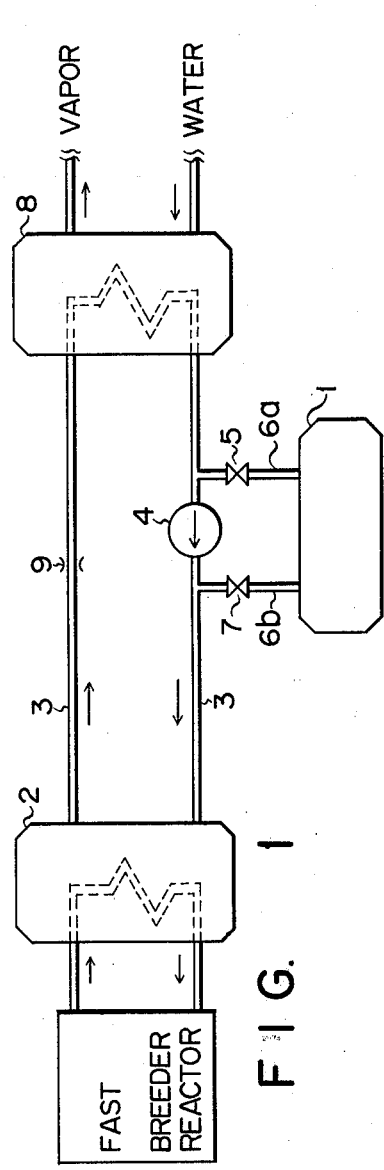
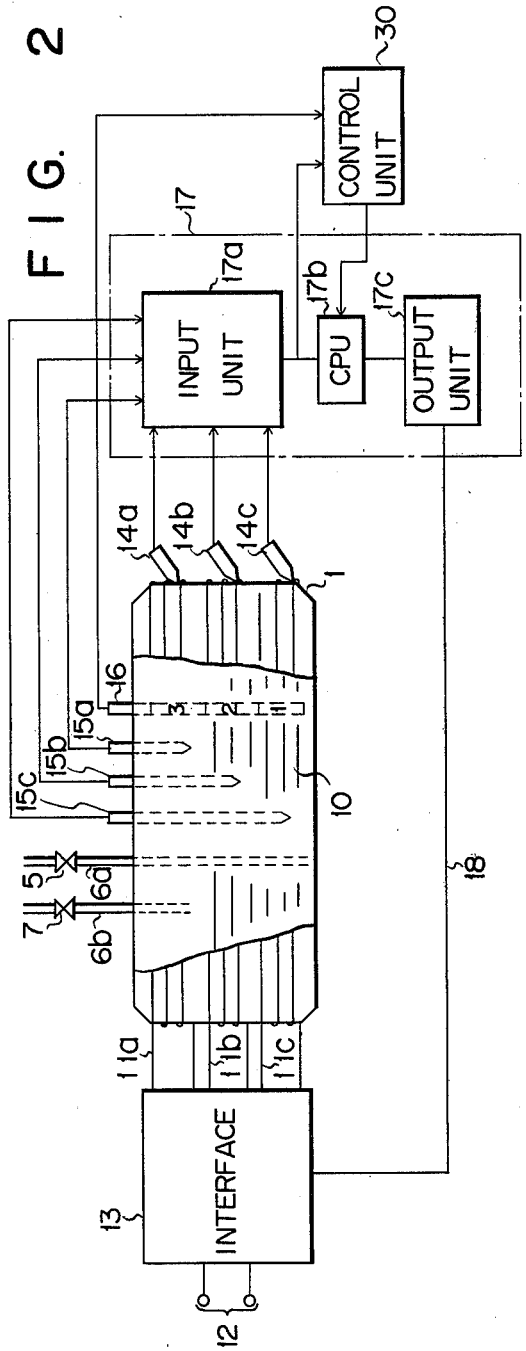
FIG. 1
FIG. 2

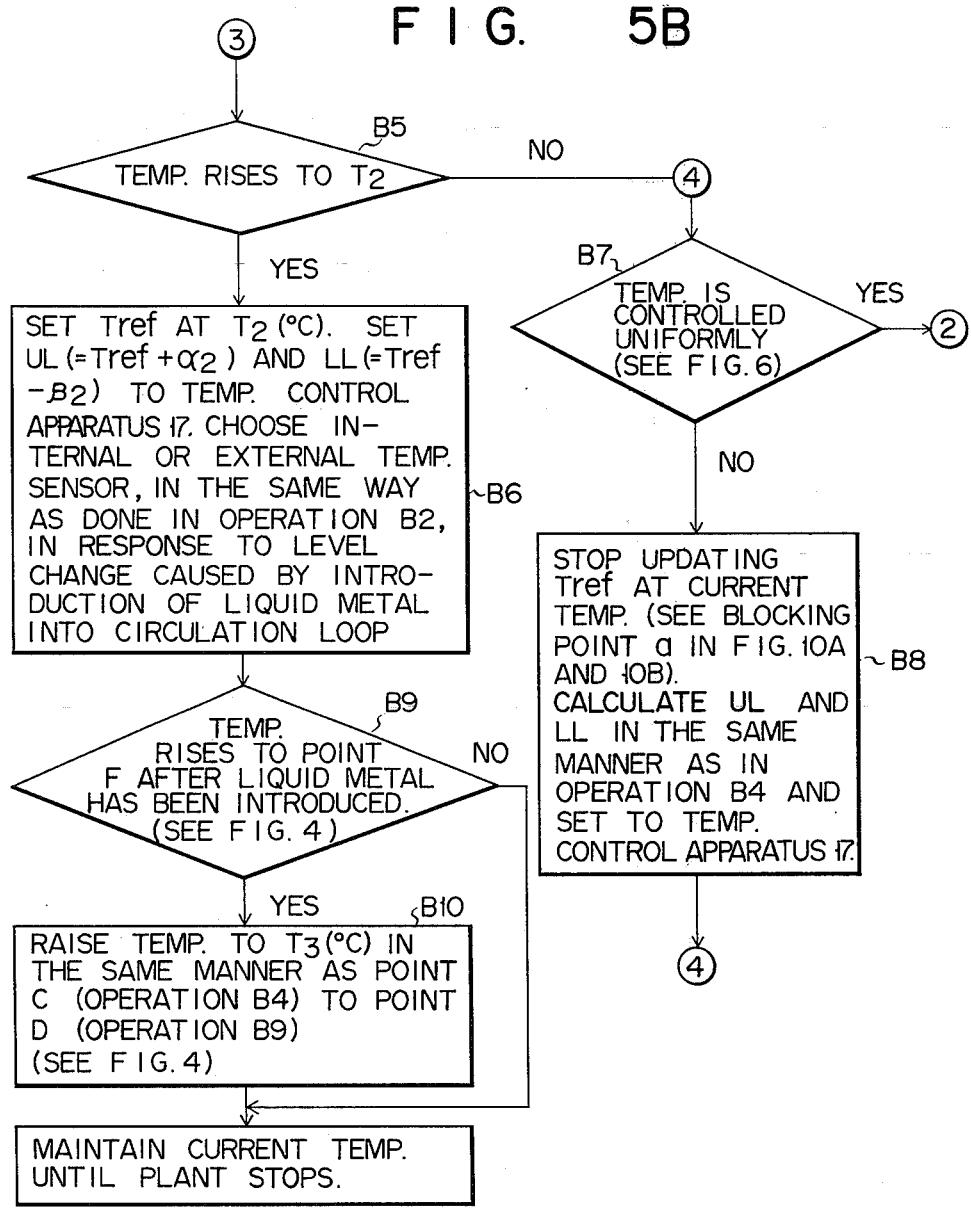

CONTROL FOR LIQUID PLANT

This is a continuation of application Ser. No. 862,275 filed Dec. 19, 1977, now abandoned.

The present invention relates to a temperature control system for a liquid plant and, more particularly to a temperature control system of a liquid metal plant for a coolant system of a fast breeder reactor.

Liquid metal such as sodium Na, sodium potassium NaK, lithium or the like, is in solid state at normal atmospheric temperature. To use liquid metal as coolant, or heat exchanger, for the liquid metal plant, the liquid metal in solid state is previously heated in a vessel such as a tank to the melting point, for example, more than about 98° C. for sodium. Then, it is further heated to a given temperature, for example, about 250° C. for sodium. Finally, it is introduced into a coolant circulating loop for a reactor, heat exchanger and the like.

FIG. 1 schematically shows a temperature control system for the liquid metal plant. A secondary coolant circulating loop of a fast breeder reactor is exemplified here, for ease of explanation. However, the control system is correspondingly applied to a reactor or other coolant systems. In FIG. 1, a vessel 1 contains liquid metal. A heat exchanger 2 is provided at the inlet and outlet with a pipe line 3 forming a circulating loop for liquid metal to effect a heat exchange with coolant in the fast breeder reactor. A pump 4 is installed on the middle way of the pipe line 3 of the circulating loop. A valve 5 permits the liquid metal in the vessel 1 to flow into the circulating loop, through a pipe line 6a, in response to the operation of the pump 4. Another valve 7 is used to return the liquid metal circulating in the circulating loop to the vessel 1 through a pipe line 6b, in response to ceasing the operation of the pump 4. A steam generator 8 is a kind of heat exchanger. The heated liquid metal passing the steam generator evaporates water also flowing therethrough. A meter 9 installed on the middle way of the pipe line of the circulating loop is used to measure the flow rate of the liquid metal circulating in the loop.

In the above-mentioned system, the valve 5 is opened and the pump 4 is operated so that the liquid metal in the vessel 1 is introduced into the circulating loop to close the valve 5. The pump 4 causes the liquid metal introduced into the loop to circulate the heat exchanger 2 and the steam generator 8, to effect heat exchange between the heat exchanger 2 and the steam generator 8. In such a system, a heater evolving Joule heat, such as an electrical heater, is installed on the vessel 1 and the pipe line 3 for heating the liquid metal in the plant system or the plant system per se. Alternately, high temperature gas is applied to them for the same purpose. Such an arrangement keeps the liquid metal in liquid state and raises its temperature to a given temperature. Generally, the temperature control is effected until the reactor is driven and the liquid metal is heated by the output of the reactor or the reactor ceases and then restarts its operation. The temperature control apparatus for controlling temperature of the liquid metal in such a temperature control system suffers from the following disadvantages.

(1) The conventional temperature control system design fails to take an account of; (a) presence of liquid metal in the pipe line, (b) the charging amount of the liquid metal therein, (c) the state, i.e. liquid or solid, of liquid metal, and the like. This results in insufficient accuracy of the temperature control for the vessel containing the liquid metal. Further, there is a possibility of unstable control of temperature due to improper control variables.

(2) None of the plant characteristic such as change of the flow rate of the circulating liquid metal is taken into account for the control scheme, as well as none of the control variables for the liquid metal temperature. This leads to poor precision of the temperature control and instability of the control system.

(3) The conventional control system employs a number of control points, for example, several thousands points of measurement in the case of the fast breeder reactor. The control was based on the operation merely using the difference between a given value and a measured value at the control point. That is, it has a lack of consideration of the interrelationship among the control points and the supervising of all the control points. For this, unevenness of temperature distribution is avoidable owing to variation of poor follow or precede of the control response.

(4) Generally, several or more control points are given for one temperature control apparatus. Processing of several thousand control points needs many temperature control apparatus, and setting and changing of the reference temperature, the alarm limiting value, and control variables are performed manually. Generally, several weeks are necessary to progressively heat the liquid metal to a given temperature, in the fast breeder reactor, although this is known as a cold start in this field. Manual control of these factors for several weeks on the basis of a schedule is accompanied by much labour, and coarse and erroneous settings. The precision of control is poor even for one control point.

Accordingly, an object of the present invention is to provide a temperature control system for the liquid plant in which the temperature control is sufficiently stable and precise, and the temperature distribution of the liquid plant is uniform.

Another object of the present invention is to provide a temperature control system in which a number of control points are totally controlled and wherein most of them are controlled at a high precision.

According to the present invention, there is provided a temperature control system for liquid plants, comprising:

liquid;

plant members including a vessel containing the liquid, a pipe line through which the liquid flows, pump which is connected to the pipe line and forces the liquid to flow and a heat exchanger coupled with the pipe line;

a plurality of heaters which are provided corresponding to the respective control points of the plant member and which heat the plant members at the respective control points;

temperature sensors for detecting the temperature of the liquid and the plant members at the respective control points;

detecting means for detecting the process value of the plant status of said plant members;

a temperature control means which receives the output signals from the temperature sensor and the detecting means to calculate at each control point the difference between a reference temperature determined by control information and a measuring temperature given from the temperature sensors in the form of a signal and to determine the control value from the result of the calculation, to produce the control signal to be directed to the heaters, whereby electric power is supplied to the respective heaters on the basis of the control signal; and a control unit which receives the output signals from the detecting means and the temperature sensors, and determine control information on a temperature control schedule of the plant previously stored, with reference to the measured temperature at each control point which is detected by the temperature sensor and inputted in the form of the input signal, and the process value which is detected by the detecting means, and supplies the control information to the temperature control means.

These and other objects of the invention will become more apparent in the detailed description taken in connection with the accompanying drawings, in which:

FIG. 1 shows a schematic diagram illustrating a construction of a temperature control system of a plant;

FIG. 2 is a block diagram of a temperature control system of liquid metal according to the present invention;

FIGS. 5A and 5B and FIGS. 6A and 6B are flow charts illustrating the function of the control unit;

Figure 3:
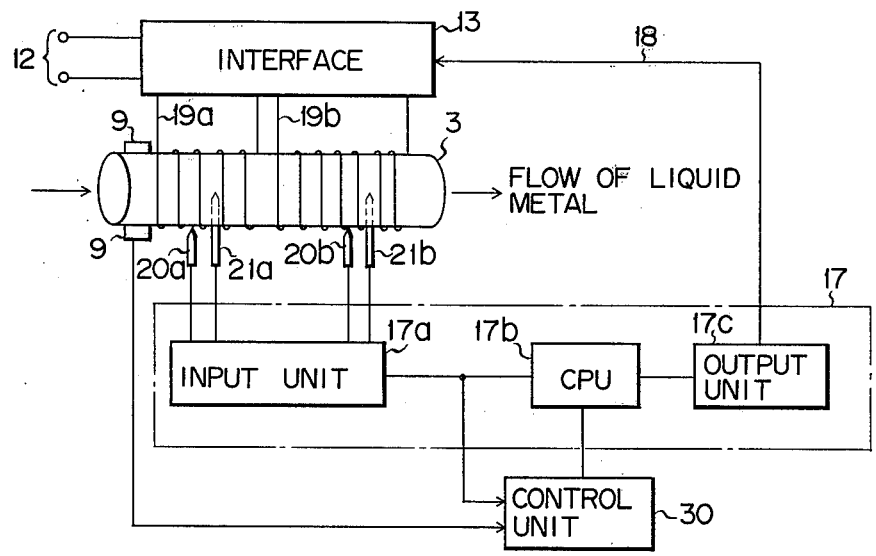
FIG. 3 is a block diagram of a temperature control system of pipe lines of the same embodiment.

Referring now to FIG. 2, there is in block form a temperature control system and the details of a vessel containing liquid metal. In the figure, like reference numerals are used to designate like or equivalent parts in FIG. 1. In FIG. 2, a vessel 1 contains liquid metal 10 charged thereinto which is in solid state at normal atmospheric temperature. Heaters 11a, 11b and 11c are installed around the outer peripheral wall of the vessel 1, at different heights. These heaters are coupled through an interface 13 to a couple of power source terminals 12. Current feeding thereinto heats the vessel 1 to raise the temperature of the liquid metal therein. External temperature sensors 14a, 14b and 14c are disposed along the outer wall of the vessel 1, to detect temperatures at the respective heights of the vessel 1. Internal temperature sensors 15a, 15b and 15c are used to measure temperature in the vessel 1. These internal temperature sensors also are arranged to sense temperatures at the different levels of the liquid metal, i.e. the charging level of it. A level detector 16 detects the charging level of the liquid metal 10 in the vessel 1. Numerals "1", "2" and "3" depicted on the level detector 16 are arranged to indicate the level positions of the liquid metal. Reference numerals 5 and 6a designate a valve and a pipe line for introducing the liquid metal into the circulating loop; 7 and 6b are a valve and a pipe line for returning the liquid metal 10 to the vessel 1. A temperature control apparatus 17 comprises an input unit 17a scanning detected temperature signals fed from two groups of temperature sensors 14a and 14c and 15a to 15c, a memory/arithmetic/control processing unit 17b (referred to as CPU) for storing detected temperature signals fed from the input unit 17a and computing and controlling them, and a process output unit 17c for receiving output signals of the unit 17b to output them as operating signals to an interface 13, via a signal line 18.

The level detector 16 applies its level detecting signals to a control unit 30. The temperature detecting signals from the input unit 17a of the temperature control apparatus 17 also is applied to the control unit 30. On the basis of these input signals, the control unit 30 computes control variables depending on control algorithm or control method and transfers the computed control variables to the CPU 17b.

It should be noted that the number of heaters and temperature sensors is not limited to three as in the above case.

FIG. 3 is a schematic view of a part of the aforementioned pipe lines and its associated temperature control system. Assume now that the liquid metal flows from left to right as indicated by an arrow through a pipe line 3 partly forming a circulating loop shown in FIG. 1. Heaters 19a and 19b installed around the outer surface of the pipe line 3 are coupled with the power source terminals 12, via the interface 13. The current feeding thereto heats the pipe line 3. External temperature sensors 20a and 20b detect the outer surface temperature at different positions. Internal temperature sensors 21a and 21b detect the temperature in the pipe line 3. Detected temperature signals from these sensors are applied to the input unit 17a of the temperature control apparatus 17. The output signals of the input unit 17a are applied to the CPU 17b where they are properly computed. The result of the computation of the unit 17b is applied to the interface 13, via the signal line 18 and output unit 17c.

Further, a rate measuring signal transferred from the detector 9 is applied to the control unit 30. The temperature detecting signals from the unit 17a also are applied to the control unit 30. The control unit processes these inputted signals to produce an appropriate control method and control variables to be directed to the CPU 17b, as in FIG. 2.

As described above, in FIG. 2 and FIG. 3, the temperature detecting signals derived from the internal and external sensors are delivered to the temperature control apparatus 17 including the input unit 17a, the CPU 17b, and the output unit 17c, for ensuring a proper temperature control. Plant input signals derived from the flow rate measuring meter 9, the level detector 6 and the like are read into the control unit 30 where it judges the operating condition in the plant to define control information which in turn is applied to the unit 17b.

The explanation to follow is the operation of the thus constructed temperature control system for the liquid metal plant.

In FIGS. 2 and 3, the temperature detecting signals outputted from sensors 14a or 15a, 14b or 15b, 14c or 15c, 20a or 21a and 20b or 21b are applied to the input unit 17a. When the temperature sensor is of thermocouple type, the cold point correction is performed and the temperature signal is linearized. The linearized temperature signal is applied to the CPU 17b. The CPU 17b stores the correspondence between a number of temperature sensors and electric heaters, for each control point, and further stores the control information such as control sampling period, reference temperature, control parameter or variables, alarm limiting value, and the like. The control methods known are a simple on-off control method, a multistage on-off control method, a PID method and others. The circuit constructions of the interface 13 and the output unit 17c are designed depending on the control method employed, as a matter of course. Here, the PID system will be employed and explanation will proceed along with it. When the temperature control is effected by a single temperature apparatus, with a single control point, it is continuously carried out so that the sampling period of the control information is unnecessary. However, to correct the idle time of the control response, the sampling method is necessary. Further, the control period information is necessary when a plurality of control points are controlled by a single temperature control apparatus.

The case where a plurality of control points are controlled by a single temperature control apparatus will be used in the following description. On the basis of the difference between the measuring temperature from the sensors fed to the input unit 17a and a reference temperature, the CPU 17b performs the PID calculation (P: Proportional calculation, I: Integration calculation, D: differential calculation) to determine the control value and delivers a signal of the calculated control value to the output unit 17c. The unit 17c converts the control value signal into a corresponding electrical signal which in turn is applied to the interface 13. Upon receipt of the electrical signal, the interface permits electrical power from the terminals 12 to be supplied to the electrical heater. The interface may be comprised of thyristors, for example, of which gates receive the control signal. Other suitable arrangements may be used for the interface. With such an arrangement, the plant apparatus heated by the electric heater is detected by the temperature sensor and the detected temperature of the liquid metal in the plant is again applied to the process input unit 17a of the temperature control apparatus 17. This process will be repeated to control the temperature of the plant apparatus to approach that of the reference temperature. In response to the measuring value from the sensor inputted through the input unit 17a, the CPU executes an alarm judgement with reference to the alarm limiting value. When the CPU 17b detects an alarm signal, (e.g., lamp, buzzer, or the like), it issues a signal to drive the control signal output unit 17c. The alarm limiting value includes an upper value, a lower value, disconnection check of the sensors, and the like. However, the above-mentioned temperature control apparatus still suffers from the previously stated problems. When the liquid metal is in solid state, the liquid metal exists only in the vessel 1 and the level detector 16 indicates "2". Under this condition, when the system starts its operation, the liquid metal in the vessel 1 must first be melted into liquid state. In the case of a plurality of control points, the thermal stress produced in the pipe lines, or other components or parts of the plant due to temperature difference through all steps of the temperature control is unevenly distributed. To prevent this, most of the control points of the plant members must be uniformly heated or cooled through all the steps of the temperature control. Description relating to this will restrictively proceed only for the temperature control of the vessel. The output of the level detector 16 is applied to the control unit 30. The unit 30 detects the level "2" of the liquid metal 10, for example. Upon the detection, the unit 30 issues to the CPU 17b an instruction to the effect that the internal temperature sensors 15b and 15c are used for the heaters 11b and 11c and the external temperature sensor 14a for the heater 11a. At this time, the control information corresponding to the respective control point such as the sampling period, the reference temperature ($T_1$ °C. in FIG. 4), the alarm limiting value and the like, which are previously stored in the control unit 30, are applied to the CPU 17b. In the manner previously stated, the control system 17 permits power supply to the heaters. Heating operation starts at this time. The temperature of the liquid metal in the vessel 1 does not exceed its melting point $T_0$ (°C.) ($T_0 = 98°$ C. for sodium) until the liquid metal is completely melted, because, at this time, the metal liquid is still in solid state and thus there is an effect of latent heat. The detecting temperature signal is read into the control unit 30 via the control system 17. When temperature slightly exceeds the melting point, the liquid metal is completely liquidized. At this time, the control unit 30 decides the temperature has reached point C in FIG. 4. The liquid metal is heated, liquidized and expanded, and the level detector reads the level "3". At this time, the heater 11a installed around the vessel 1 in FIG. 2, issues to the temperature control system 17 an instruction so as to automatically change the control mode to the internal control mode using the internal temperature sensor 15a, through the control unit 30. However, when the level of the liquid metal does not reach level "3", the external control mode by using the temperature sensor 14a will continue. The heaters 11b and 11c are subjected to the internal temperature control mode by using the internal temperature sensors 15b and 15c.

Figure 4:
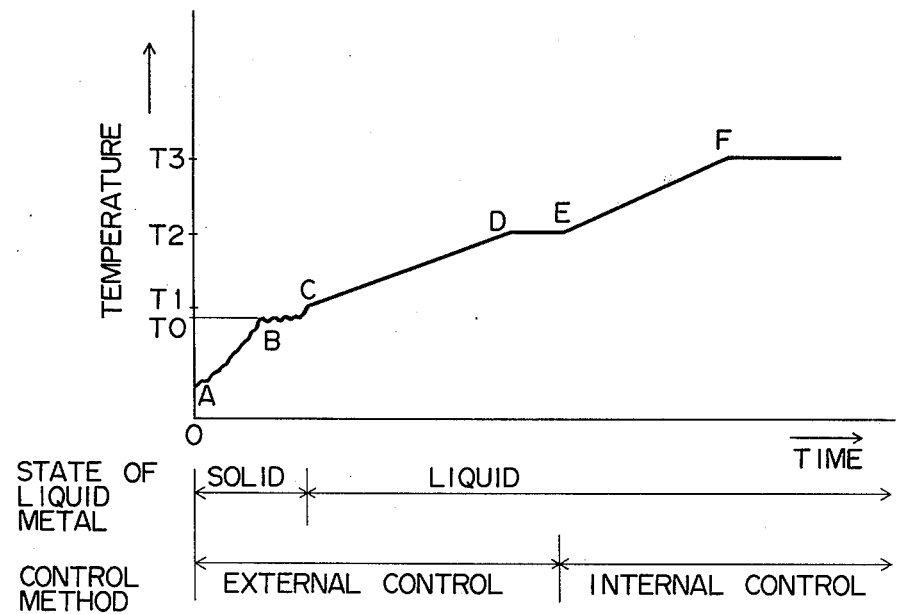
FIG. 4 is a graph showing a temperature-time relationship when an operating schedule of the system is assumed in this embodiment.

In FIG. 4, during the time period from a point C to a point D, the liquid metal in the vessel 1 is raised until a normal temperature $T_2$ °C. (approximately two hundreds and several tens °C. for Na) of the liquid metal to be charged into the circulating loop is reached. The control of the temperature rise is performed by using a permissible temperature difference and a predetermined rate of temperature change, which are given so as to minimize the thermal stress, and parameters relating to the restriction of the thermal stress minimization.

The control unit 30 checks the level detector 16 until the temperature reaches a point D in FIG. 4 and changes the control mode of the heater 11a into the internal control mode, if it is permissible. When the temperature control proceeds to reach a point D, corresponding to the temperature $T_2$ °C., the valve 5 in FIG. 1 opens and the pump 4 is operated so that the liquid metal is introduced into the circulating loop. At a point E in FIG. 4, the introduction of the liquid metal is completed. At this time, the valve 5 closes and the liquid metal circulates in the circulating loop shown in FIG. 1, with the assistance of the operation of the pump 4 or the like.

At the point E, the level of the liquid metal in the vessel 1 falls. Then, the control unit 30 detects the value of the level detector 16 and places the heaters 11a, 11b and 11c, of FIG. 2 in the external control mode. It is rare to raise the temperature above the temperature $T_2$ (°C.) at the point E. However, when the temperature is raised to $T_3$ °C. at a point F, the liquid metal plant is controlled as in the manner of the temperature control step from C to D shown in FIG. 4. For preparation for such a rare case, it is preferable to incorporate such a case into the operating schedule. If so, an operator judges if it is necessary to raise the temperature up to the point F or not and, if necessary, merely gives an instruction to the control unit 30 to effect the temperature rise.

Figure 5A:
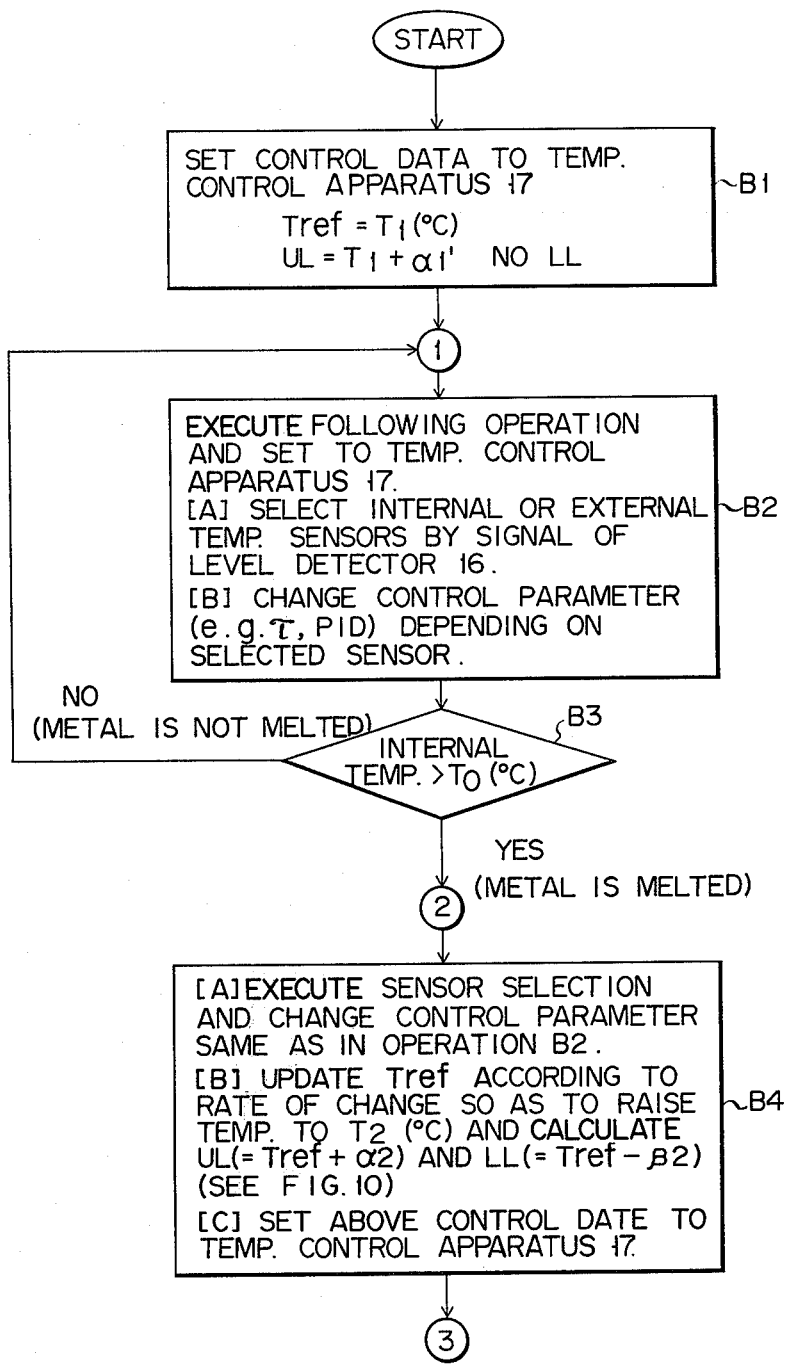
Figure 6A:
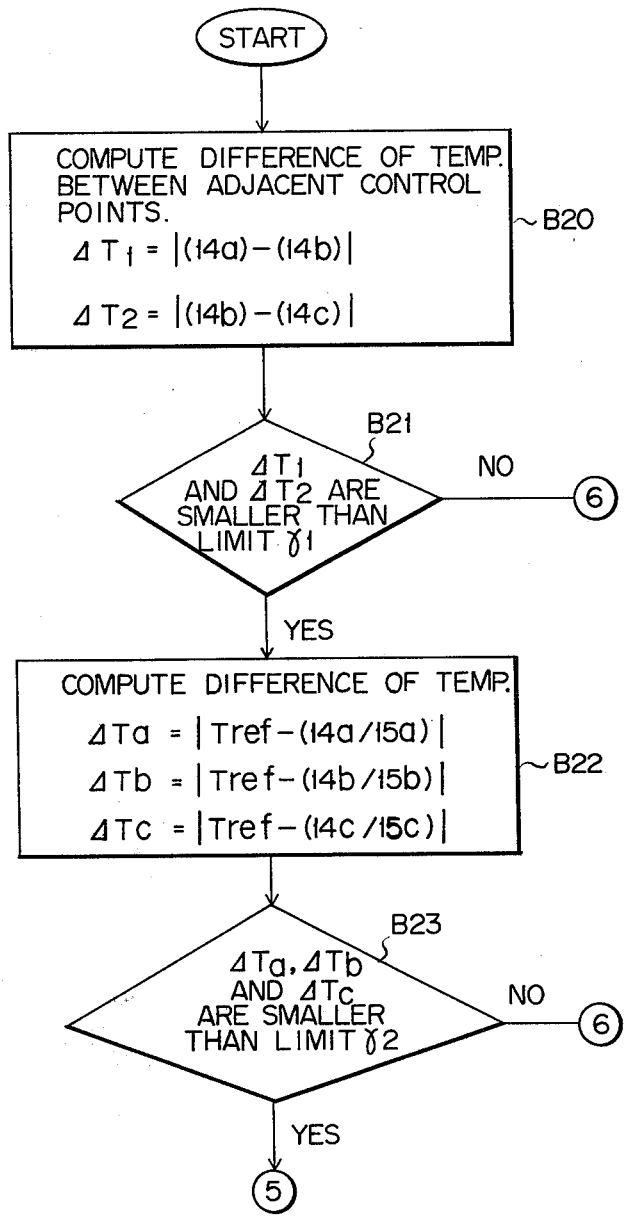
Figure 6B:
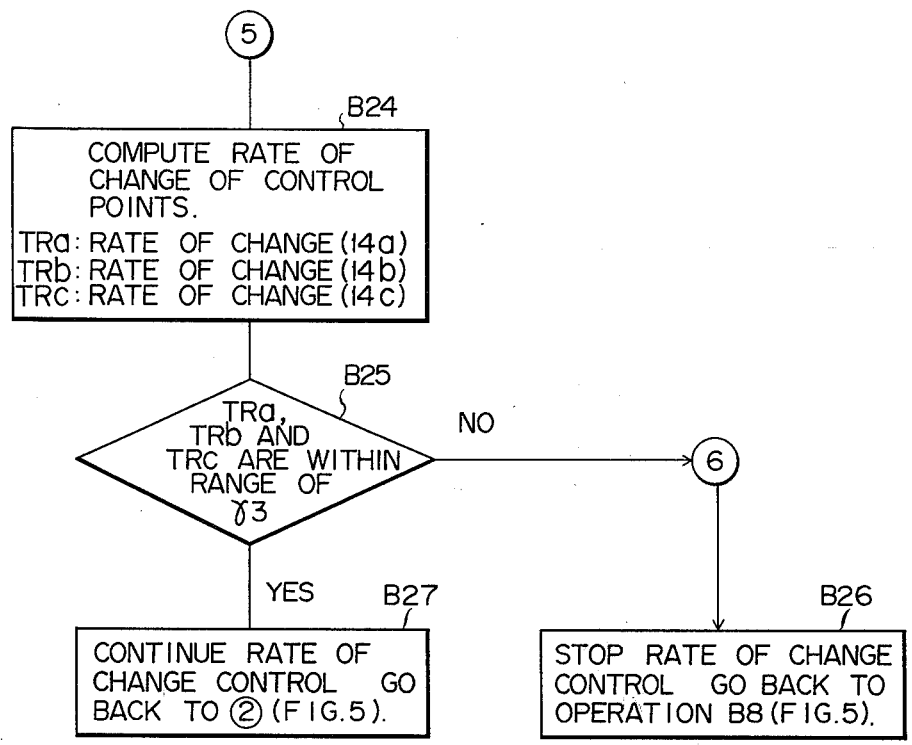
Figure 10A:
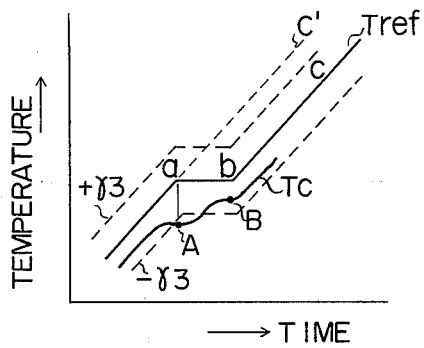
FIGS. 10A and 10B are graphs for illustrating the way of control for the cases of poor follow and precede of control response with respect to a reference value.
Figure 10B:
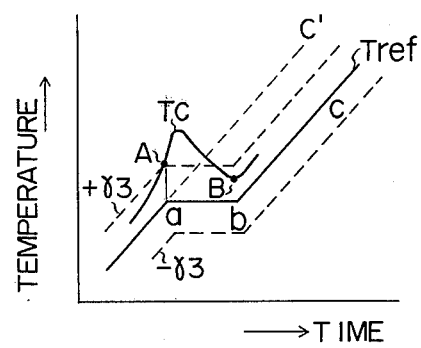

The temperature control thus far mentioned may be expressed in terms of flow charts as shown in FIGS. 5A and 5B, and FIGS. 6A and 6B. FIGS. 5A and 5B show an entire flow of the temperature control by the control unit 30, and FIGS. 6A and 6B show a detailed flow of the uniform temperature control. In the FIGS. 5A and 5B, and FIGS. 6A and 6B, Tref designates a reference temperature; UL an alarm limiting value (upper limit); LL an alarm limiting value (lower limit); $\tau$ a control period; $\alpha_1$, $\alpha_2$, $\beta_1$, $\beta_2$ variables for UL and LL; $\gamma_1$, $\gamma_2$, $\gamma_3$ permissible values for judging a uniform temperature control. In the flow charts, reference numerals ①, ②, ③, ④, ⑤ and ⑥ merely indicate positions between adjacent steps and have no particular meaning. The parentheses in each block of a flow chart in FIGS. 5A to 6B denote the temperature sensed by each temperature sensor indicated by numeral 14. FIGS. 5A, 5B, 6A and 6B relate to the temperature control system in FIG. 2 and its operating schedule in FIG. 4, with omission of the function of the temperature control system 17. FIGS. 10A and 10B show the case where a step B26 of FIG. 6B fails to continue the rate of charge control (for example, during the control period C-D) and, for this, the control step shifts to a step B6 in FIG. 5. In FIG. 10, Tref designates a reference temperature, and Tc, an indication of the temperature sensors. Alarm limiting values UL, LL are omitted, for simplification. Permissible deviation ($+\gamma_3$, $-\gamma_3$) indicates the change rate being within the permissible value, and is indicated by a dotted envelope to the reference temperature Tref. The alarm limiting values UL and LL are generally given by UL>Tref+$\gamma_3$ and LL<Tref$-\gamma_3$ and the envelope (not shown) of them lies on the outside of the envelope of ($+\gamma_3$, $-\gamma_3$). However, this relation between them is not essential to the present invention. In FIG. 10A, the reference temperature Tref must shift toward a straight line a-c' in FIG. 10A. However, the measuring temperature is a poor follower of control response and thus, at the point A in FIG. 4, it deviates from the permissible deviation ($-\gamma_3$). For this, the reference temperature Tref is folded or blocked at a point a in FIG. 10A to wait for the following measuring temperature. At this time, the temperature control system 17 continues the control of the reference temperature Tref. When the measuring temperature reaches close to the reference temperature. The control unit 30 detects the fact that the measuring temperature has entered within a permissible value (FIGS. 10A, 10B), and, after the point B, controls the measuring temperature following the reference temperature Tref, thus preventing separation of the measuring temperature Tc from the reference temperature Tref. This is true in FIG. 10B.

In the case of several hundred to several thousand control points, the condition for placing all of the temperature difference among control points, and the rate of change within the permissible difference, are very strict for the uniform temperature control described above with reference to FIGS. 10A and 10B. Therefore, the permissible deviations $\gamma_1$, $\gamma_2$, $\gamma_3$ described in FIG. 6 are carefully selected for each control point by considering the quality of the follow-up performance of the control points, the plant condition and the like, and the selected ones are stored in the control unit 30. It is not necessary to satisfy the condition that all the factors must fall within the permissible deviation. In this case, whether it is necessary to check that condition depending on the plant condition, every control point, or the expanded permissible deviation, is previously stored in the control unit 30. Even if such a countermeasure is taken, there still remains several control points where that condition is unsatisfied for a long time. In such a case, the operator judges it and instructs the control unit 30 to by-pass the checking operation of such control points. As a result, the stopping of the temperature control for a long time owing to such a rare case can be prevented.

In this manner, the temperature control of the vessel in FIG. 2 on the basis of the operating schedule in FIG. 4 is performed. The temperature control of the pipe line in FIG. 3 on the basis of the operating schedule is performed in a manner similar to that of FIG. 5. This is correspondingly applicable for the uniform temperature control in FIGS. 6, 10A and 10B. The internal or external temperature controls in accordance with the charging level of the liquid metal in the vessel in FIG. 5, are successively switched by the control unit 30. However, in the case of the circulating loop such as the pipe line, the following process is substituted.

Figure 7:
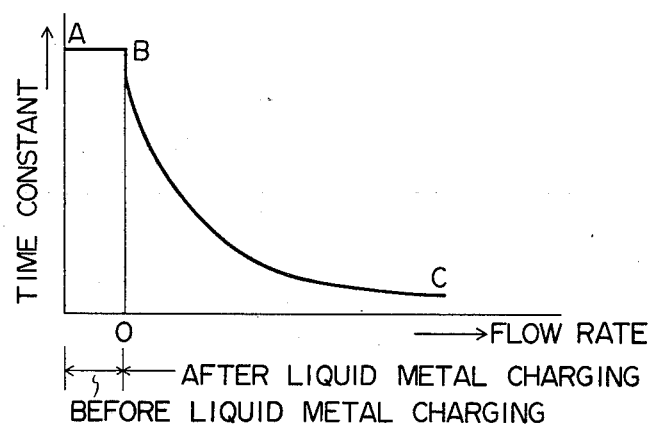
FIG. 7 is a graph showing an example of the variation of time constant of pipe lines with respect to presence or absence of liquid metal and the flow rate.
Figure 8:
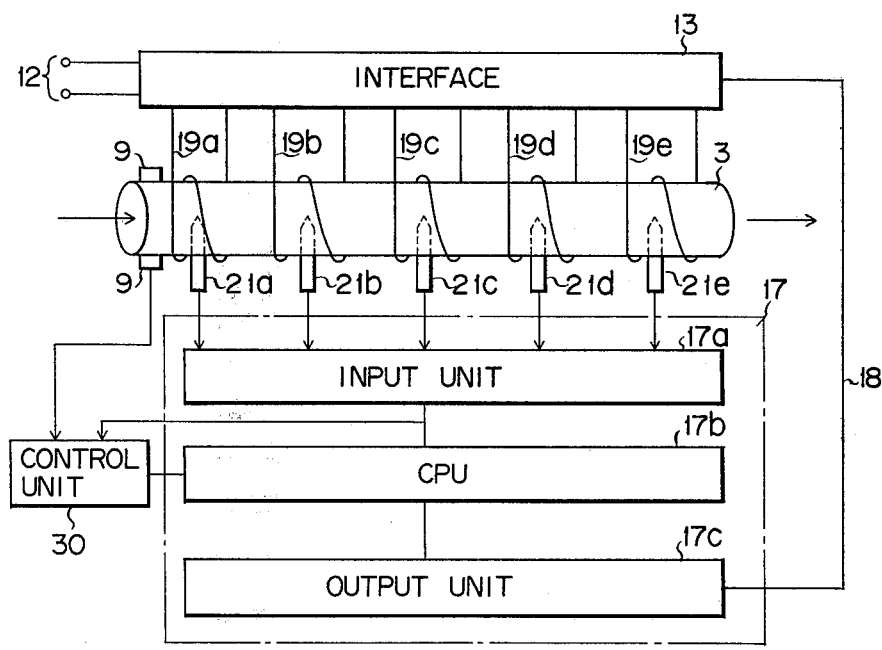
FIG. 8 shows a block diagram for illustrating the selection of the heater and its associated temperature sensor relating to the flow rate.

Referring now to FIG. 7, there is shown the variation of the time constant of the pipe line 3 with respect to the presence of the liquid metal and the flow rate thereof in the pipe line. As seen from the figure, the plant characteristic such as time constant, i.e. that of the sampling period, is changed by the flow rate. It is necessary, therefore, to control the internal temperature in the pipe line in accordance with the change of the flow rate, i.e., liquid metal charging (point A), when the flow rate begins after the charging (point B), and when the flow rate is large (point C). The time constant varies several to several tens of times, depending on the shape of the pipe line. In FIG. 8, heaters 19a to 19c are installed around the outersurface of the pipe line, and internal temperature sensors 21a to 21e are provided. In this case, the sensors 21a to 21e do not necessarily indicate the temperature of the liquid metal heated by the correspondingly disposed heaters 19a to 19e. When the liquid metal flows in the direction of the arrow, the detection delay is produced with the value of the flow rate. The internal sensor to detect the feedback signal of the heat quantity fed by the heater 19a must be properly selected from the internal sensors 21a to 21e, in accordance with the indication of the meter 9 for measuring the flow rate.

Figure 9:
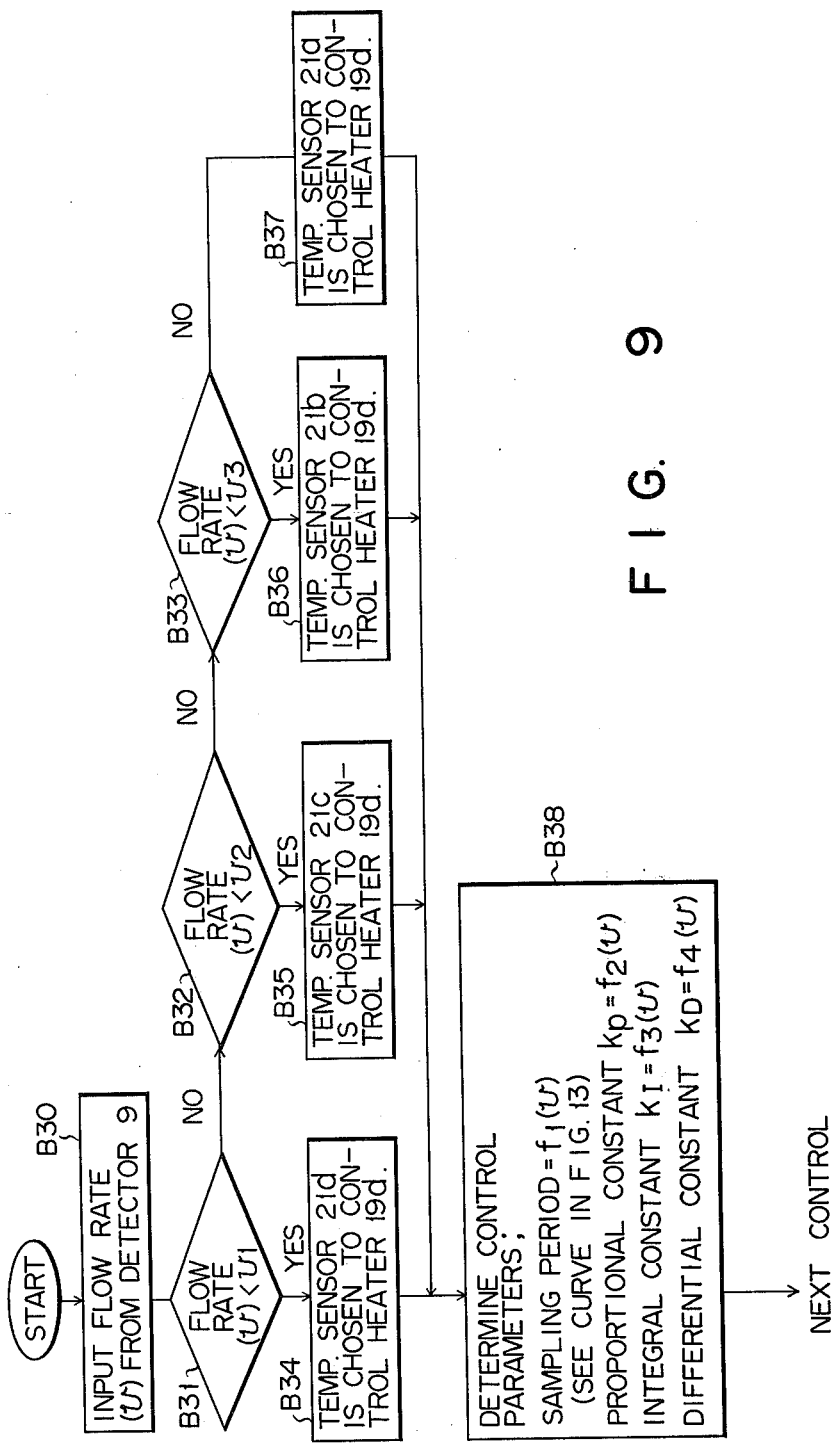
FIG. 9 is a flow chart for computing optimum control variables.

Solution for the problems raised relating to FIGS. 7 and 8 will be described by using the flow chart illustrating the control unit 30 in FIG. 3. FIG. 9 describes the control of the heater 19d in FIG. 8, for ease of explanation. The description may be correspondingly applied to other control points. The physical disposition of the sensors 21a to 21d of FIG. 8 provides indicative values $v_1$, $v_2$ ... ($v_1 < v_2$ ... ) relating to the flow rate to indicate the temperature sensor to be selected for the flow rate. If these values are previously stored in the control unit 30, and the indication of the flow rate, measuring meter 9 is inputted, the proper sensor may be automatically and easily selected. Accordingly, this is done with the transference of the result of the judgement by the control unit 30 into the temperature control system 17.

Figure 13:
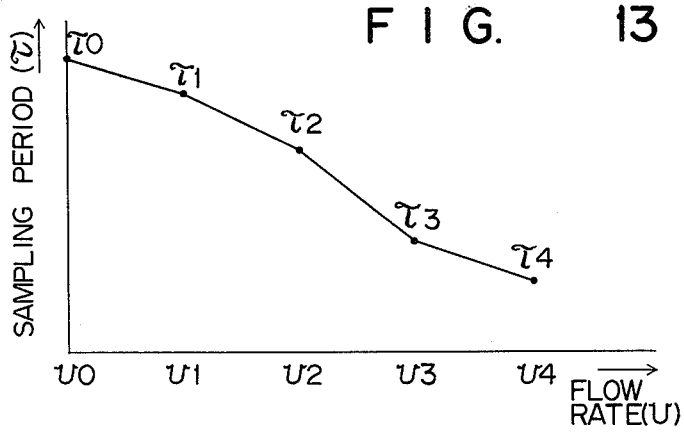
FIG. 13 shows data to be stored in a control unit with a predetermined sampling period corresponding to the flow rate, determined by an analysis.

There are two ways to decide control parameters; one for the lamp shaped reference temperature and the other for the predetermined reference temperature. These are principally equal, and thus only the control variable deciding method for the predetermined reference temperature will be employed for explanation to be given below. The sampling period $\tau$ will be described by using the example shown in FIG. 13. If the plant characteristic such as the time constant shown in FIG. 7 is previously obtained by measuring or calculation, precise parameters may be obtained by using the control theory or that corrected by field testing to ensure a stable control precisely responding to the flow rate. If the previously decided control parameters are stored in terms of the curve $f_1(v)$ in the control unit 30, the sampling period $\tau$ for arbitrary flow rate (v) may be easily obtained. The proportional constant $K_P$ and integration constant $K_D$ may also be obtained by a similar calculation of the sampling period $\tau$. The optimum control corresponding to the flow rate may be gained when the control unit 30 transmits these parameters to the temperature control system 17. The control parameters are successively controlled by the control unit 30 in the manner just mentioned. This involves the situation where the control parameters have no differential compensation ($K_D=0$) or no integration compensation ($K_I=0$), before the liquid metal is charged into the pipe line in the liquid metal plant shown in FIGS. 1 and 2 or the pipe lines 6a and 6b, which do not constitute the circulating loop shown in FIG. 2, and thus implies change of the control algorithm in the on-line as well as change of the control parameters.

On the other hand, when the liquid metal is returned from the circulating loop to the vessel 1 at the plant shut down, it is performed through the valve 7 in FIG. 1. At this time, with progression of drain, the control mode at the pipe line of the circulating loop is changed from the internal temperature mode to the external temperature mode, and the control mode at the vessel portion from the internal control mode to the external control mode. The switching of the control mode is automatically made through the control unit 30. The temperature control when the temperature falls may be carried out in a manner that is similar to the temperature control at the start of the liquid metal plant.

In this manner, the internal and the external temperature controls may be selected at each control point by the presence of the liquid metal. The control parameters of the control algorithm may be optionally selected in accordance with the plant characteristic variation resulting from the change of the plant condition, and the sampling control method is effective for the control system including idle time. The sampling period corresponding to the condition may be selected. Additionally, the condition wherein the pipe line or other components in the plant are locally and excessively heated or cooled may be prevented. Therefore, uniform temperature control is possible. Further, if the alarm control value is updated by the control unit 30 when the reference temperature Tref shifts, and the updated one is applied to the temperature control system and its limiting value is compared with the plant condition, it is possible to perform an alarm supervision in accordance with the plant condition.

For the control signal mode outputted from the temperature control system and the interface, a simple ON-OFF control, a multistage ON/OFF control, or the like may be used depending on the means for heating the heater. Note here that, in the present invention, the deciding method for deciding the control method, the control algorithm and the control parameters is principally invariable regardless of these control means.

While the above-mentioned example relates mainly to the liquid metal for the fast breeder reactor, the present invention is applicable to the temperature control of the testing facilities using the liquid metal other than in the reactor, and to the temperature control of the plant using other liquid. Additionally, the present invention may be embodied in the following manner.

(1) In FIG. 2, presence of the medium is detected by detecting the medium level change in the vessel. Instead of this, the combination of the valves shown in FIG. 11 or the indication of the flow rate detector of FIG. 12 may be used for detecting the presence of the medium. For example, the control unit 30 judges that valves 21 and 22 are open and valves 23 and 24 are closed. Under this condition, if the medium flows in the pipe 25 in the direction of the arrow, it is judged that the medium is present in the valves 22 and 21. The control unit 30 issues an instruction reflecting this condition to the temperature control system 17. In FIG. 12, valves 26 and 27, and flow detectors 28 and 29 are disclosed. If the valve 26 is closed, the valve 27 is open and the meter 29 indicates a certain value, and it is judged that the medium flows through the valve 27.

Figure 11:
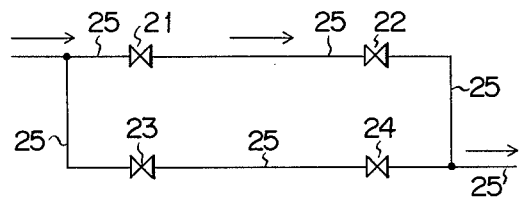
FIGS. 11 and 12 are pipe line portions of another embodiment of the present invention.
Figure 12:
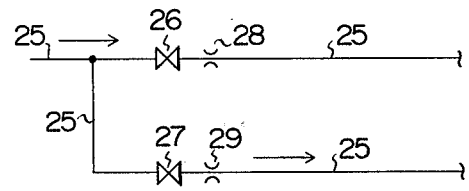

The combination of FIGS. 11 and 12 and the indication of other detectors may be used for the detection of the medium.

(2) In FIG. 2, the indication of the meter 16 in the vessel 1 is discrete, i.e. "1", "2" and "3". However, the indication may be continuous.

(3) In the example mentioned above, the temperature control system 17 and the control unit 30 are separately provided; however, these may be integrally constructed. In other words, the temperature control and the plant condition are processed in a single processing unit. If the fast breeder plant or the like having several control points, it is difficult to control these control points by using a single temperature control system. The risks in trouble occurrence must be diversified. For this reason, these control points are divided into several groups and each of the groups is subjected to the control of a temperature control system. Further, the construction of the temperature control system is simplified as much as possible. In such a case, it is preferable to install separately the temperature control system and the control unit and to assign several temperature control systems for a single control unit. However, in the case of a relatively small number of control points, it is preferable to unify these units.

The most available apparatus for the control unit is an electronic computer. The computer is preferable in that the supervision of the operation schedule is easy and the control information is easily and rapidly decided and the like. Other suitable apparatuses may be used if they have the above-mentioned function.

As described above, the present invention uses the control unit, and various other process values than the temperature sensors read into it. Further, the control information corresponding to the plant condition is decided from the process value. The signals reflecting the control information are applied to the control unit of the temperature control system to control the temperature of the liquid metal. Therefore, the temperature control system according to the present invention is able to optimally control temperature with a stable control system, thereby eliminating unevenness of the temperature distribution.

I claim:

1. A temperature control system for liquid plants in coolant systems of nuclear plants utilizing a heat exchange liquid that is capable of solidifying absent the application of a heat source of a predetermined temperature, comprising:

plant members including a vessel for containing liquid, a pipe line into which the liquid is introduced from the vessel, at least one pump which is connected to the pipe line and forces said liquid to circulate through the pipe line, a heat exchanger coupled with the pipe line, a plurality of heaters which are provided corresponding to the respective control points of said plant members and which heat said plant members at the respective control points, temperature sensors for detecting the temperature of said liquid and said plant members at the respective control points and detecting means for detecting a process value representing the plant;

a temperature control means which receives the output signals of said temperature sensors, calculates at each control point the difference between a reference temperature and the temperature detected by said temperature sensors, and determines a control valve from the result of the calculation to produce control signals for controlling electric power being supplied to said respective heaters;

a control unit which receives the output signals from said detecting means and the temperature sensors, selects control information from a temperature control schedule of the plant in accordance with the temperature detected by the temperature sensors and the process value detected by said detecting means, and supplies said temperature control means with the control information determining the reference temperature.

2. A temperature control system according to claim 1, wherein said temperature sensors include external temperature sensors which are disposed around the outer surface of said plant members to detect the temperature of the plant members and internal temperature sensors which are disposed inside the plant members to detect the temperature of the liquid therein; said detecting means includes a detecting device for detecting the presence or absence of liquid at the respective control points of said plant members; said control unit selects a control information from the temperature control schedule in accordance with the output signals of the detecting device which represent the presence or absence of liquid at the respective control points of said plant members and supplies the control information to said temperature control means, said control information instructing that one of the external and internal temperature should be sampled at respective control points; and said temperature control means determines control values for the respective control points in accordance with the control information and the temperature detected by the internal or external temperature sensors.

3. A temperature control system according to claim 1, wherein said detecting means includes a flow rate measuring device for measuring the flow rate of the liquid in said pipe line; said control unit determines control information including a control instructing change of the relationship between the control points of said temperature sensors and the control points of said heaters, in accordance with the flow rate of the liquid detected by the flow rate measuring device and the presence or absence of liquid; and said temperature control means controls said heaters by means of the control information determined by said control units.

4. A temperature control system according to claim 1, wherein said control unit detects whether one of the temperature differences between the control points of said plant members, the difference between the reference temperature and the temperature detected at each control point and the rate of temperature change at each control point is within a permissible range of deviation, supplies said temperature control means with control information for stopping the updating of the reference temperature given by the temperature control schedule when said values deviate outside the permissible range, and supplies said temperature control means with control information for updating the reference temperature when said values come within the permissible range of deviation.

5. A temperature control system according to claim 1, wherein said detecting means includes a flow rate measuring device provided on the pipe line and a level meter provided on said vessel.

6. A temperature control system according to claim 1, wherein said detecting means includes a device for measuring the flow rate of the liquid in said vessel, and said control unit selects control information, including control variables, in accordance with the flow rate of the liquid and transfers the control variables to said temperature control means.

7. A temperature control system according to claim 1, wherein said liquid is liquid metal.

8. A temperature control system according to claim 1, further comprising an interface electrically connected between said heaters and said temperature control means for receiving control signals from said temperature control means and controlling electrical power to be supplied to said respective heaters.

9. A temperature control system according to claim 1, wherein said temperature control means comprises a plurality of temperature control apparatus, and said control unit supplies the control information to each of the temperature control apparatus.

10. A temperature control system according to claim 1, wherein said detecting means includes a valve connected to the pipe line for detecting the presence of the liquid.

11. A temperature control system according to claim 1, wherein the pipe line, pump and heat exchanger constitute a liquid circulating path.

* * * * *